United States Patent
Memarzadeh

(10) Patent No.: US 10,551,505 B2
(45) Date of Patent: Feb. 4, 2020

(54) IONOSPHERIC SCINTILLATION PREDICTION

(71) Applicant: Fugro Intersite B.V., Leidschendam (NL)

(72) Inventor: Yahya Memarzadeh, Leidschendam (NL)

(73) Assignee: Fugro Intersite B.V. (NL)

( * ) Notice: Subject to any disclaimer, the term of this patent is extended or adjusted under 35 U.S.C. 154(b) by 325 days.

(21) Appl. No.: 15/508,869

(22) PCT Filed: Sep. 5, 2014

(86) PCT No.: PCT/EP2014/069006
§ 371 (c)(1),
(2) Date: Mar. 3, 2017

(87) PCT Pub. No.: WO2016/034252
PCT Pub. Date: Mar. 10, 2016

(65) Prior Publication Data
US 2017/0276793 A1    Sep. 28, 2017

(51) Int. Cl.
*G01S 19/07* (2010.01)
*G01S 19/08* (2010.01)
(Continued)

(52) U.S. Cl.
CPC .............. *G01S 19/07* (2013.01); *G01S 19/08* (2013.01); *G01S 19/258* (2013.01); *G01S 19/09* (2013.01); *G01S 19/10* (2013.01); *G01S 19/13* (2013.01)

(58) Field of Classification Search
CPC .......... G01S 19/07; G01S 19/08; G01S 19/09; G01S 19/10; G01S 19/13; G01S 19/258
(Continued)

(56) References Cited

U.S. PATENT DOCUMENTS

| 5,828,336 A | * | 10/1998 | Yunck | G01S 19/07 342/357.31 |
| 6,799,116 B2 | * | 9/2004 | Robbins | G01S 5/009 340/991 |

(Continued)

FOREIGN PATENT DOCUMENTS

| CN | 104090280 A | * | 10/2014 | | G01S 19/07 |
| WO | 9918677 A1 | | 4/1999 | | |
| WO | WO 2019/185500 A1 | * | 11/2016 | | G01S 19/07 |

OTHER PUBLICATIONS

Redmond et al., "A Forecasting Ionospheric Real-time Scintillation Tool (First)", Space Weather, vol. 8, 2010.*

(Continued)

*Primary Examiner* — Chuong P Nguyen
(74) *Attorney, Agent, or Firm* — Polsinelli PC

(57) ABSTRACT

A method of generating scintillation prediction data comprises: •a) for a plurality of satellites (12A), and reference stations (10A, 10B, 10C, 10D) measuring phase scintillation data, satellite by satellite for each reference station during multiple epochs (t−2, t−1, t, t+k); •b) forecasting an expected phase scintillation value for each satellite and reference station for a period of at least 24 hours based on a cyclical prediction model; •c) for a given user location (20) and a given satellite, spatially interpolating the expected phase scintillation values of the plurality of reference stations to determine a predicted phase scintillation index; •d) repeating step c) for further satellites visible from the user location.

17 Claims, 9 Drawing Sheets

(51) Int. Cl.
*G01S 19/25* (2010.01)
*G01S 19/09* (2010.01)
*G01S 19/10* (2010.01)
*G01S 19/13* (2010.01)

(58) Field of Classification Search
USPC ............ 342/357.44, 357.45, 357.46, 357.47, 342/357.51; 701/475
See application file for complete search history.

(56) References Cited

U.S. PATENT DOCUMENTS

| | | | |
|---|---|---|---|
| 8,344,946 B2* | 1/2013 | Um | G01S 19/07 |
| | | | 342/357.58 |
| 9,244,174 B2* | 1/2016 | Averin | G01S 19/07 |
| 9,488,729 B2* | 11/2016 | Averin | G01S 19/07 |
| 9,576,082 B2* | 2/2017 | Sparks | G01S 19/07 |
| 9,678,212 B2* | 6/2017 | Scheitlin | G01S 19/20 |
| 9,921,314 B2* | 3/2018 | Jakel | G01S 19/07 |
| 9,964,645 B2* | 5/2018 | Scheitlin | G01S 19/20 |
| 2013/0271318 A1* | 10/2013 | Doucet | G01S 19/25 |
| | | | 342/357.64 |
| 2017/0070283 A1* | 3/2017 | Floch | G01S 19/07 |
| 2017/0139050 A1* | 5/2017 | Curran | G01S 19/40 |
| 2019/0056505 A1* | 2/2019 | Morley | G01S 19/04 |
| 2019/0250278 A1* | 8/2019 | Huck | G01S 19/07 |

OTHER PUBLICATIONS

Beniguel et al., "Ionospheric scintillation monitoring and modelling" Annals of Geophysics, vol. 52, N. 3/4, Jun./Aug. 2009.*
International Search Report and Written Opinion; PCT Application No. PCT/EP2014/069006; dated May 12, 2015.
Sarma, A.D. et al.; "Forecasting of Ionospheric Scintillations of GPS L-Band Signals Over an Indian Low Latitude Station", 2013 IEEE Antennas and Propagation Society International Symposium (APSURSI), Jul. 6, 2014.
Elmunim, N. et al.; "Short-term Forecasting Ionospheric Delay Over UKM, Malaysia, Using the Holt-Winter Method", 2013 IEE International Conference on Space Science and Communication (ICONSPACE), Jul. 1, 2013.
Aquino, M. et al.; "Towards Forecasting and Mitigating Ionospheric Scintillation Effects on GNSS", ELMAR 2007, Sep. 1, 2007; (Sep. 1, 2007), pp. 63-67.
Sridharan, R. et al.; "First results on forecasting the spatial occurrence pattern of L-band scintillation and its temporal evolution", Journal of Atmospheric and Solar-Terrestrial Physics, vol. 119,Jul. 5, 2014 (Jul. 5, 2014), pp. 53-62.

* cited by examiner

IONOSPHERIC SCINTILLATION PREDICTION

CROSS-REFERENCE TO RELATED APPLICATIONS

This application is a national stage entry of PCT/EP2014/069006 filed Sep. 5, 2014, said application is expressly incorporated herein in its entirety.

BACKGROUND OF THE INVENTION

1. Field of the Invention

The present invention relates to methods of predicting ionospheric scintillation and in particular methods of providing a user of a Global Navigation Satellite System (GNSS) with information relating to the reliability of positioning data derived from individual satellites.

2. Description of the Related Art

The ionosphere is a region of the Earth's atmosphere, from about 80 to 1000 km above its surface, where significant numbers of free electrons and ions are present. The free electrons and ions are produced by solar ionizing radiation (extreme ultraviolet and X-ray radiations) and by collisions of energetic particles (solar wind) with the neutral particles at the upper atmosphere. Positive ions and electrons in the upper atmosphere are usually well mixed and form electrically neutral plasma.

The ionosphere can affect L-band, and therefore GNSS, signal propagation and can therefore be important for the accuracy of such systems. The effect of the ionosphere on GNSS signal propagation is a function of the Total Electron Content (TEC) along the signal path and the frequency of the signal. TEC is an integrated quantity that represents the number of free electrons in a column of 1 m$^2$ cross-section along the signal path between satellite and receiver, expressed in TEC units with 1 TECU=10$^{16}$ electrons/m$^2$ corresponding to about 16 cm range error for the GPS L1 frequency (1575.42 MHz). Rapid fluctuation of TEC leads to phase scintillation of the signal. In case of severe phase scintillation, the carrier tracking loop in a GNSS receiver may have problems to track. For this reason, it is important to consider these effects.

Various manners of detecting ionospheric scintillation are presently used. These may rely on multi-frequency receivers monitoring e.g. the GPS L1 and L2 frequencies with differential phase measurement between the dual frequencies or may alternatively rely on dedicated scintillation receivers such as Septentrio PolaRxS™ and NovAtel FlexPak6™.

One service provided by the Australian Government Bureau of Meteorology is a GPS TEC derived scintillation map. This map is derived using data with a 1 Hz sampling rate from GPS receivers. The underlying quantity computed is the variance of the time derivative of the TEC over 1 minute intervals. This is commonly known as ROTI (Rate of TEC) and serves as a measure of present ionospheric scintillation since the disturbed ionospheric conditions that cause scintillation lead to short timescale variations in the TEC.

Another system is disclosed by US2009224969, which describes a method for determining the ionospheric error across a network of GNSS reference stations. The method relies on dual-frequency phase measurements in a geometry-free linear combination. The data is filtered for ambiguities and the characteristic parameters of the ionosphere. In combination with filter results from other combinations of phase measurements (ionosphere free combination), the physically-based model provides ambiguity resolution. The method uses limited prediction of scintillation in time and space by fitting of spherical harmonic functions.

Although measurement of the error due to ionospheric scintillation is presently possible, it would be desirable to provide alternative services allowing prediction of scintillation in time.

BRIEF SUMMARY OF THE INVENTION

According to the present invention, there is provided a method of generating scintillation prediction data comprising:

a) for a plurality of satellites, and reference stations, measuring phase scintillation data, satellite by satellite for each reference station during multiple epochs;

b) forecasting an expected phase scintillation value for each satellite and reference station for a period of at least 24 hours based on a cyclical prediction model;

c) for a given user location and a given satellite, spatially interpolating the expected phase scintillation values of the plurality of reference stations to determine a predicted phase scintillation index;

d) repeating step c) for further satellites visible from the user location.

By separating the spatial and temporal prediction, greater accuracy is achievable and a useful result can be obtained, allowing a prediction to be made of the expected phase scintillation at the user location. This may allow a user to determine in advance whether or not to commence a particular operation within a given window, based on the likelihood of ionospheric disturbances.

According to one preferred embodiment, the method may further comprise a step e) of computing a Scintillation Dilution Of Precision (SDOP) index by mapping the predicted phase scintillation indices of the satellites visible from the user location onto the position domain. Such an index further simplifies the process of determining the likelihood of positioning error for a given period, since it better allows a user to take into account not only the likely error for a given satellite but the dilution of precision for the combination of satellites available. Thus if a high degree of scintillation is predicted for a given satellite, this may not lead to a lack of precision if a number of other (undisturbed) satellites will be visible at that moment in time.

In a particular embodiment, the cyclical prediction model of step b) is an exponential smoothing model, in particular a triple exponential smoothing model that takes into account seasonal changes as well as trends. This may be a Holt-Winters prediction model as further described in detail below.

According to experimental observations, it is believed that using a multiplicative Holt-Winters prediction model may give good results. This is because the observed seasonal pattern in the course of a day is proportional to the level of data, whereby for an expected phase scintillation value k epochs ahead, the sum of the local mean level and the trend over k epochs is multiplied by a factor indicative of the variation over a whole season.

According to another aspect of the invention, step c) may take place by determining ionosphere pierce points (IPPS) for signals received from the given satellite for each of the reference stations. As a result of using IPPS, the mapping of scintillation effects is associated with their position within the ionosphere. This gives greater accuracy in spatially predicting the effects on a user location that is receiving positioning information from different satellites over a relatively wide field of vision. Preferably, the ionosphere is modeled as a thin layer and the global position of the intersection between the line joining the satellite and receiver with this thin layer defines the IPP. In addition to the thin-layer approximation for the ionosphere, the slant TEC is mapped on the vertical TEC (VTEC) using a simple cosine function based on the elevation angle of the satellite. In the following VTEC is used for further calculations.

Once the IPPs between the visible satellites and reference station have been established, step c) may further comprise performing linear spatial interpolation between the IPPs. The IPPs form a patch within which linear spatial interpolation may be applied to provide the momentary or future phase scintillation index at any location within or outside the patch. In the following, although reference is given to interpolation i.e. between points, this is also understood to include extrapolation beyond a given point. For the given user location and given satellite, an IPP location is determined and by spatially interpolating the phase scintillation values derived for the plurality of reference stations observing the satellite through that patch, the phase scintillation index for the user observation can be determined. Preferably, interpolation takes place by a Kriging method. For weighting, the covariance function is chosen as a simple linear function of the distance between the IPPs.

In order to further improve the accuracy of prediction, the method may also comprise determining the height of the IPPs or the effective height of the local ionospheric thin layer with which the scintillation is primarily associated. One method of determining the height of the IPP is by observation of the time difference between scintillation start-up and sunset at ground level. Since scintillation typically commences at sunset, by observing the time lag with respect to sunset on the ground and by applying basic trigonometry as described below, a more accurate determination of the height of the disturbance may be achieved. In reality, height of such disturbances may vary from 200 km to 500 km although most of the irregularities occur in the F region between 300 km and 400 km height. For a satellite viewed at an elevation of 30° above the horizon, a variation in height of the IPP between 300 km and 400 km can account for a horizontal displacement of the IPP by around 145 km. This may be used to determine a slant or curve of the ionospheric thin layer within the patch.

In a still further embodiment, the scintillation prediction data as generated in step e) may comprise converting a phase scintillation index for each satellite into a range error with respect to the user location. In terms of useful information, this data represents an important measure of what influence the scintillation may have on the user and may be better applicable for further processing to provide e.g. the SDOP index.

In a particular embodiment according to an aspect of the invention, the scintillation prediction data may be provided to a user at the user location. This data may be provided in real time, or quasi-real time.

According to a further aspect of the invention, the scintillation prediction data may also comprise loss-of-lock indications. For a GNSS signal, rapid fluctuation of TEC leads to phase scintillation of the signal. In case of severe phase scintillation, the carrier tracking loop in the receiver may have difficulties to track the signal. For a receiver tracking an L-band signal, a rapid change of only 1 radian of phase in a time interval equal to the inverse of the receiver bandwidth can be enough to cause problems for the receiver's tracking loop. In this case, the signal amplitude also fades enough to result in Loss-Of-Lock and consequently a phase discontinuity or cycle slip. The fading of signal due to ionospheric disturbances is called amplitude scintillation. The loss-of-lock indications may be predicted loss-of-lock indications, providing for a given satellite at a given user location an indication of whether or not loss-of-lock may be expected. In general, these values may be binary or Boolean values and the method may further comprise:

f) for the plurality of satellites and reference stations, determining loss-of-lock occurrences for a carrier tracking loop of a GNSS receiver at the reference station;

g) forecasting expected loss-of-lock occurrences for each satellite and reference station for a period of at least 24 hours based on a cyclical prediction model;

h) for the user location and given satellite, spatially interpolating the expected loss-of-lock occurrences of the plurality of reference stations to determine a predicted loss-of-lock indicator for the given satellite at the user location.

In one embodiment, the cyclical prediction model may consider the seasonal (24 hour) variation to be unity. Furthermore, the predicted loss-of-lock value may include a prediction of the chance to have cycle slips. The predicted loss-of-lock values may also be provided to the user at the user location. Basing the prediction model for the seasonal variation on the value for the previous 24 hours is considered a best-fit model for this value. By providing data including the chance of cycle slips to the user, the user can also determine the accuracy of this prediction over previous seasons and determine, based on the essential nature of the operation, whether to proceed or not.

Various methods are available for measuring the phase scintillation data. In one preferred embodiment the reference stations comprise multi-frequency receivers and step a) takes place by linear combination of dual frequency phase observations. This allows existing networks of reference stations to be used to provide the data without requiring additional scintillation receivers to be provided.

According to another aspect of the proposed method, the plurality of satellites are earth-orbiting satellites (e.g. GNSS satellites) and the method further comprises estimating the scintillation information for IPPs between the user location and geostationary satellites visible from the user location and transmitting the scintillation information to a user at the user location. Although the geostationary satellites are not usually relied upon for global positioning, they are used to provide correction signals by which the accuracy of e.g. GNSS positioning is enhanced. Loss of these correction signals can therefore seriously affect the positioning accuracy even if the SDOP index at the user location is otherwise favorable.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
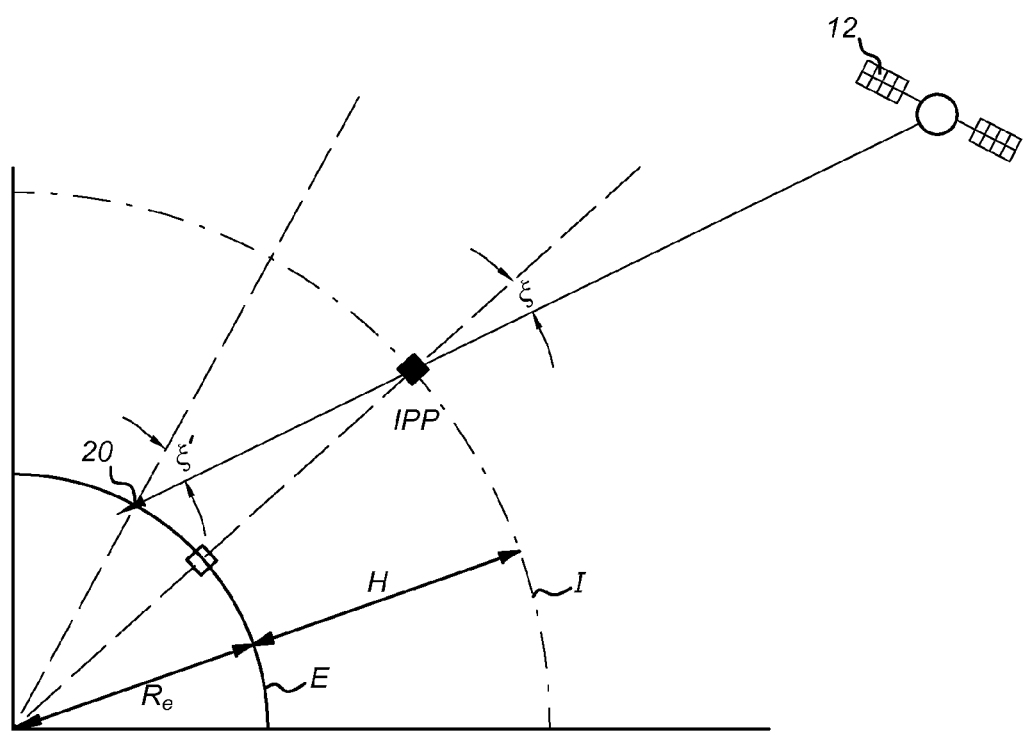
FIG. 1 shows the geometry of the thin-layer ionosphere.

In order to better understand the context of the invention, a brief introduction to the calculation of ionospheric effects is provided, on which the invention is based. Due to the Earth's rotation, the ionosphere is a highly dynamic medium and the electron density can vary significantly from minute to minute at a given location resulting in temporal and spatial variations of TEC. FIG. 1 shows the geometry of the thin-layer ionosphere I at height H above the Earth E, including a satellite 12 visible from a user location 20. The line of sight between the satellite 12 and user location 20 passes the ionosphere I at the ionospheric pierce point (IPP). The satellite zenith angle ξ at the IPP is thus distinct from the satellite zenith angle ξ' measured at the user location 20. For simplicity and to exclude height dependency of TEC, a thin-layer approximation is used for the ionosphere and the slant TEC is mapped onto the vertical TEC using a simple cosine function:

$$VTEC(t,\varphi,\lambda,H) = m(\xi) \cdot TEC(t, \vec{\rho}(t)) \qquad (1)$$

$$\vec{\rho}(t) = \vec{r}^s(t) - \vec{r}_R \qquad (2)$$

Where φ and λ are geographic latitude and longitude of the ionospheric pierce point (IPP), H is the height of the thin ionosphere layer, ξ is the satellite zenith angle at the IPP, $\vec{r}^s$ and $\vec{r}_R$ stand respectively for geocentric position vectors of satellite and receiver.

The total VTEC variation along a satellite trajectory can be shown to be as follows:

$$dVTEC = \left(\frac{\partial VTEC}{\partial t} + \frac{\partial VTEC}{\partial \varphi} \cdot \frac{\partial \varphi}{\partial t} + \frac{\partial VTEC}{\partial \lambda} \cdot \frac{\partial \lambda}{\partial t}\right) \cdot dt \qquad (3)$$

Where $$\frac{\partial \varphi}{\partial t} \text{ and } \frac{\partial \lambda}{\partial t}$$

stand for projected satellite velocity on the thin-ionosphere layer respectively along latitude and longitude.

For time series analysis, the pattern of VTEC observations can be decomposed into regular (i.e. trend: long-term and seasonal variations due to Earth daily rotation and annual revolution) and irregular (short term and random-like) variations. The regular variation may be a few TECU and the irregular variation may be as little as a tenth of a TECU.

GNSS signal scintillation is due to the irregular and rapid fluctuations of TEC in space. In order to measure scintillation, it is required that TEC is detrended. A simple way of detrending is between-epoch differencing of TEC observations. Assuming a 1 Hz or higher sampling rate (dt≤1 s) and a zero time derivative of VTEC yields:

$$dVTEC \approx \frac{\partial VTEC}{\partial \varphi} d\varphi + \frac{\partial VTEC}{\partial \lambda} d\lambda = \vec{\nabla} VTEC \text{ with } \vec{\nabla} = [d\varphi, d\lambda] \qquad (4)$$

where $\vec{\nabla}$ TEC denotes the gradient of VTEC. Between-epoch differencing of VTEC observations (with sampling rate≤1 Hz) leads to a detrended VTEC time series (dVTEC), which is more likely to consist of only the irregular and random-like fluctuations of VTEC along a satellite trajectory. dVTEC is the rate of TEC which is also referred to as ROTI.

Phase Scintillation and Loss-of-Lock

Any changes in TEC along a signal path result in a phase change of the signal. The following equation is used to convert dVTEC to the GNSS phase variation:

$$d\phi(t) = \frac{40.3}{c \cdot f} \cdot dVTEC(t) \qquad (5)$$

where f is the relevant GNSS signal frequency and c is the speed of light. Rapid fluctuation of TEC leads to phase scintillation of the signal. In case of severe phase scintillation, the carrier tracking loop in a GNSS receiver may have problems to track. For a receiver tracking an L-band signal, a rapid change of only 1 radian of phase in a time interval equal to the inverse of the receiver bandwidth can be enough to cause problems for the receiver's tracking loop. In this case, the signal amplitude also fades enough to result in Loss-Of-Lock and consequently a phase discontinuity or cycle slip. The fading of a signal due to ionosphere disturbances is called amplitude scintillation. In the following, one radian is used as a threshold to detect cycle slips in the time series of dφ(t). Note that one radian corresponds to ~0.2 TECU (and ~3 cm range error for the GPS L1 frequency). The number of cycle slips per minute is used as an index (denoted by $NLL_{60}$) to measure the severity of the amplitude scintillation along a satellite trajectory. In case of no amplitude scintillation, $NLL_{60}$ will be equal to zero; in the most extreme case $NLL_{60}$ can never exceed 60.

To measure phase scintillation, the standard deviation of dφ over every 60 seconds is calculated (denoted by $\sigma_{\phi 60}$) excluding the cycle slips. Note that the phase scintillation index will be $0 < \sigma_{\phi 60} < 1$ radians.

Predictability of the Scintillation

The electron density irregularities in the equatorial region take place between sunset and midnight with activity occasionally continuing until dawn. The irregularities are more likely to repeat daily after sunset at a given location in the equatorial region.

Figure 2:
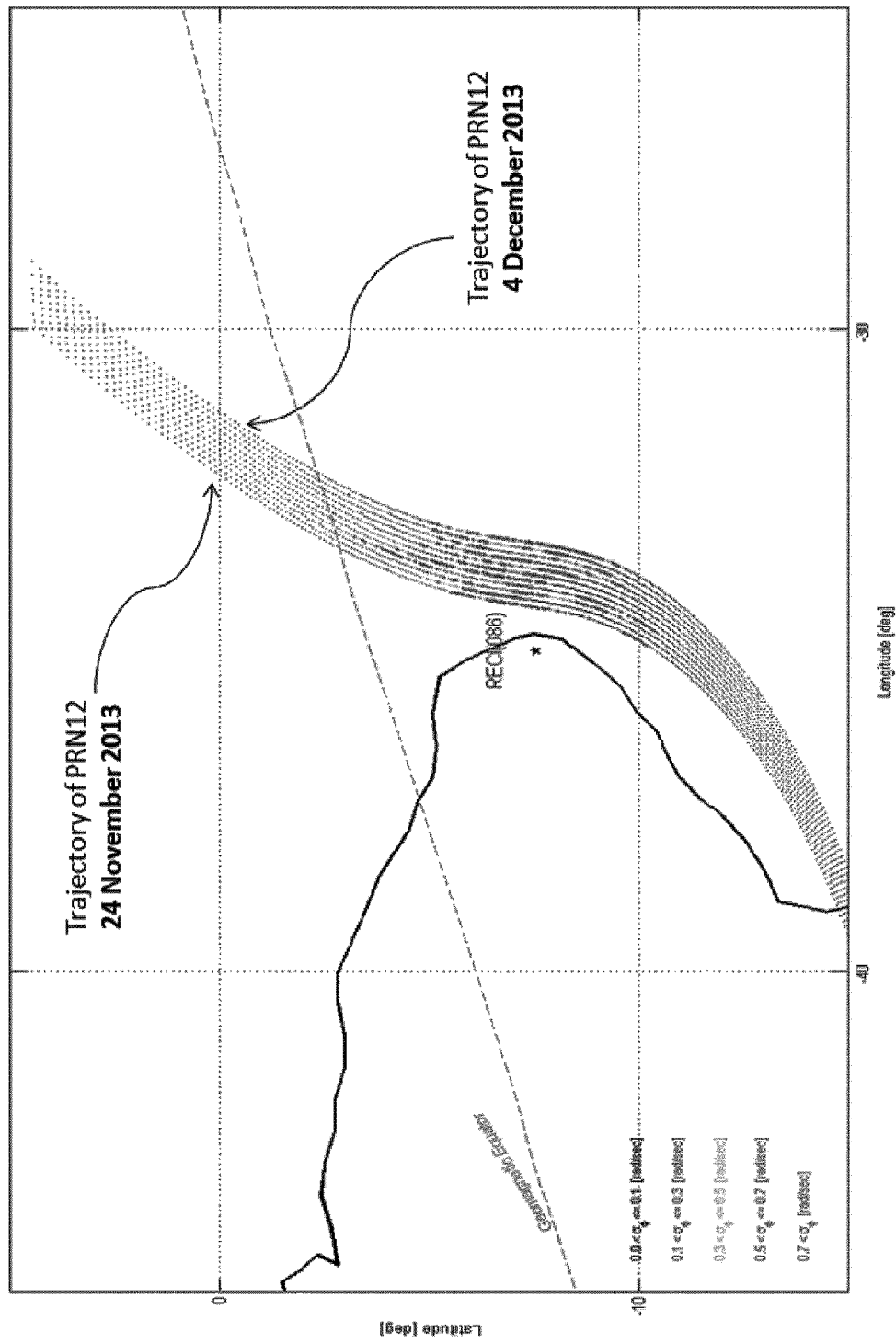
FIG. 2 shows a plot of daily repetition of scintillation along GPS PRN 12 trajectory from 24 Nov. to 4 Dec. 2013 in Recife.

In order to show daily repetition of the irregularities in space, the phase scintillation index $\sigma_{\phi 60}$, determined at Recife for PRN 12 from 24 Nov. to 4 Dec. 2013, is plotted in FIG. 2, whereby the solid circles show the IPPs with severe phase scintillation ($0.7 \leq \sigma_{\phi 60}$ radians). It can clearly be seen in FIG. 2 that scintillation varies for different ionospheric patches.

Time series measurements of $\sigma_{\phi 60}$ and $NLL_{60}$ determined at Recife for PRN 12 from 24 Nov. to 4 Dec. 2013 have shown that repetition of scintillation in time takes place from one day to the next.

Prediction of Phase Scintillation

The repeatability of the scintillation in time and in space provides an opportunity to statistically predict the scintillation and provide a real-time scintillation forecast system.

For predicting scintillation effects on positioning at a given user location, the following steps are performed:
1) Temporal prediction of phase scintillation index satellite by satellite at the reference stations,
2) Spatial interpolation of the predicted phase scintillation index between reference stations for the user location,
3) Mapping phase scintillations of visible satellites at the user location into the position domain.

1) Temporal Prediction of Phase Scintillation

As discussed above and on the basis of measurements it has been found that there are scintillation periods after sunset which almost repeat every day due to the earth's rotation. Assuming a day to be a full period, the time series of $\sigma_{\phi 60}$ contains a repeated trend and a seasonal pattern. There are two seasons in the course of the day: scintillation and non-scintillation hours.

A Holt-Winters method is used for forecasting phase scintillation ($\sigma_{\phi 60}$) for the next 24 hours. The Holt-Winters method is a statistical forecast method that captures appropriately the seasonality of data. There are two Holt-Winters models: the Additive model and the Multiplicative model. The main distinction between additive and multiplicative models is seasonality. The additive model is appropriate if the seasonal pattern is almost constant through the time series. If the seasonal pattern is proportional to the level (or local mean) of data, the multiplicative model is preferred.

Data analysis of the time series of $\sigma_{\phi 60}$ for a given location has shown that the time series of $\sigma_{\phi 60}$ contains a constant trend but the level of data is not constant. It can be considered that the seasonal pattern in the course of day is proportional to the level of data. Therefore, the multiplicative Holt-Winters model for forecasting the phase scintillation is used.

For a measured time series of $\sigma_{\phi 60}$, denoted by $X(t_1)$, $X(t_2)$, ..., $X(t_n)$, to forecast $X(t_{n|k})$, the forecast made at time $t_n$, k steps ahead, is denoted by $\hat{X}_n(t_{n+k})$. The mathematical equations of the multiplicative Holt-Winters model are written as:

$$L(t_n) = \alpha \cdot (X(t_n)/I(t_{n-p})) + (1-\alpha) \cdot (L(t_{n1}) + T(t_{n1})) \quad (6)$$

$$T(t_n) = \beta \cdot (L(t_n) + L(t_{n-1})) + (1-\beta) \cdot T(t_{n-1}) \quad (7)$$

$$S(t_n) = \gamma \cdot (X(t_n)/L(t_n)) + (1-\gamma) \cdot S(t_{n-p}) \quad (8)$$

where $L(t_n)$, $T(t_n)$, and $S(t_n)$ stand respectively for the local mean level, trend, and seasonal factor at time $t_n$ and p is the number of observation epochs in the seasonal cycle. The smoothing parameters $\alpha$, $\beta$, and $\gamma$ are constants between 0 and 1 and used for updating the level, trend, and seasonal factor. The forecast made at time $t_n$ for k=1, 2, ..., p is given by $$\hat{X}_n(t_{n+k}) = (L(t_n) + k \cdot T(t_n)) \cdot S(t_{n+k-p}) \quad (9)$$

Note that the time interval of the time series of $\sigma_{\phi 60}$ is 1 minute because the phase scintillation index $\sigma_{\phi 60}$ is computed every minute (i.e. p=1440 for the seasonal cycle as one day contains 1440 minutes).

Figure 3:
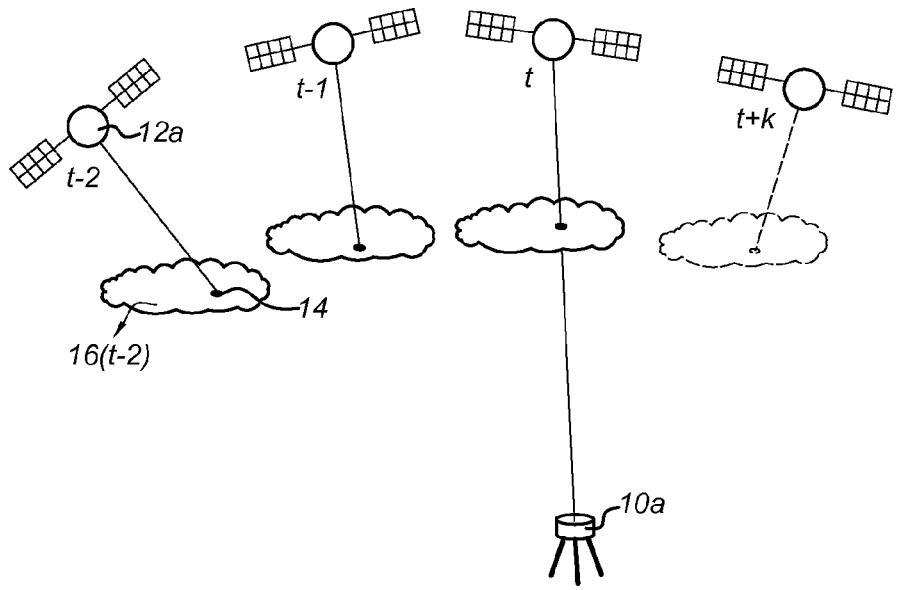
FIG. 3 shows measurement of the time series of $\sigma_{\phi 60}$ over a plurality of epochs for a given satellite and a given reference station.

FIG. 3, shows a reference station 10A observing an orbiting satellite 12A during a number of epochs (t−2) to (t+k). The time series of $\sigma_{\phi 60}$ is measured over a plurality of epochs for the satellite 12A, with the observations taking place through successive IPPs 14A(t−2) to 14A(t+k) defined within successive ionospheric patches 16(t−2) to 16(t+k). This is repeated for all further reference stations within the region.

2) Spatial Interpolation of Phase Scintillation (Kriging Method)

Figure 4:
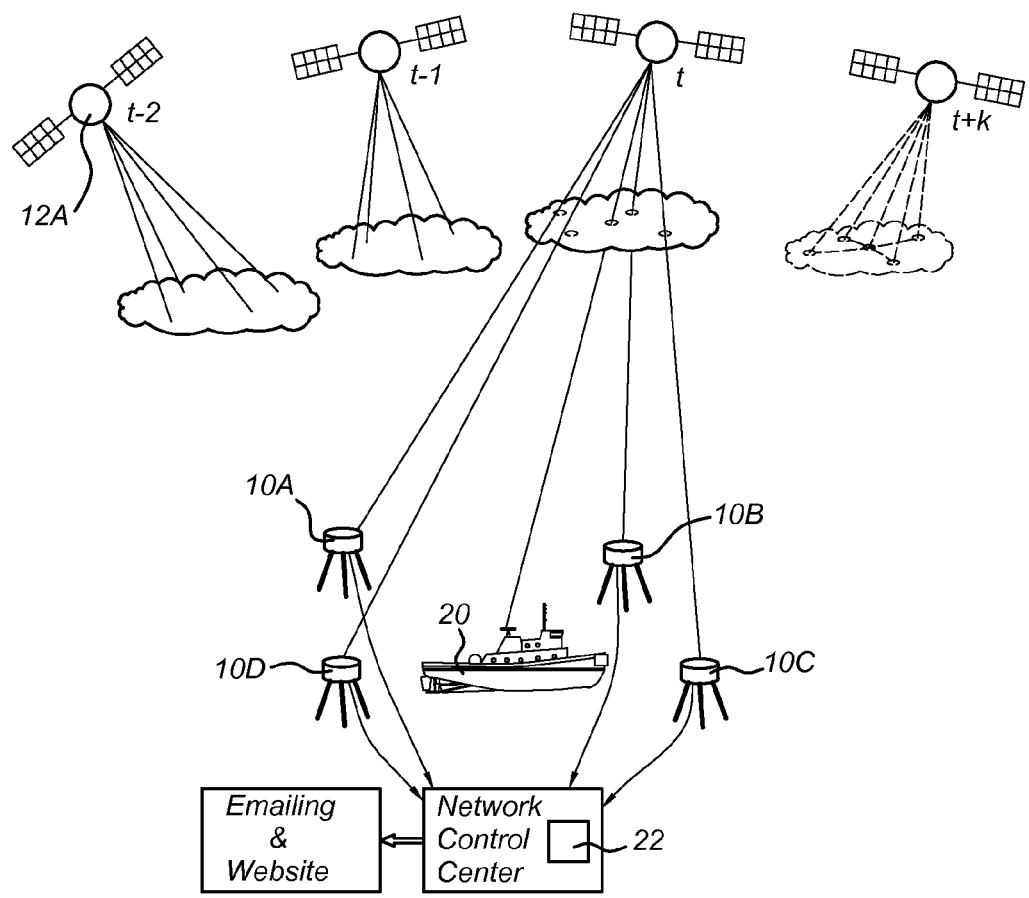
FIG. 4 shows spatial interpolation for each ionospheric patch between a satellite and the reference stations.

In order to compute the phase scintillation index between a given user and a visible satellite, spatial interpolation is required. The spatial interpolation is carried out individually for each ionospheric patch (between a satellite and the reference stations), epoch by epoch, and is shown in FIG. 4 using the Kriging interpolation method. Kriging is a linear spatial interpolation method that takes the spatial correlation into account. It is also a best linear unbiased predictor if the covariance function is correctly selected. The covariance function is chosen as a simple linear function of the distance; i.e. $c_{ij} = L - l_{ij}$ where $c_{ij}$ and $l_{ij}$ stand respectively for covariance and distance between IPPs of i and j, and L is an arbitrary constant that should be greater than the maximum distance between IPPs According to FIG. 4, a regional network of reference stations 10A to 10D receives signals from satellite 12A and provides the observations to a processing unit 22 at a Network Control Center (NCC) to process the data to compute phase scintillation indices for reference stations for the satellite at epoch (t). Then the processing unit 22 at time t can predict the phase scintillation indices for t+k epochs ahead for the reference stations for the given satellite. The processing unit 22 uses the Kriging interpolation method to calculate a prediction of phase scintillation index of IPP between a given user location and the satellite for t+k epochs ahead. The predicted scintillation index for the user can be either sent to the user by email or shown on the website.

3) Scintillation Effect on GNSS Positioning

Figure 5:
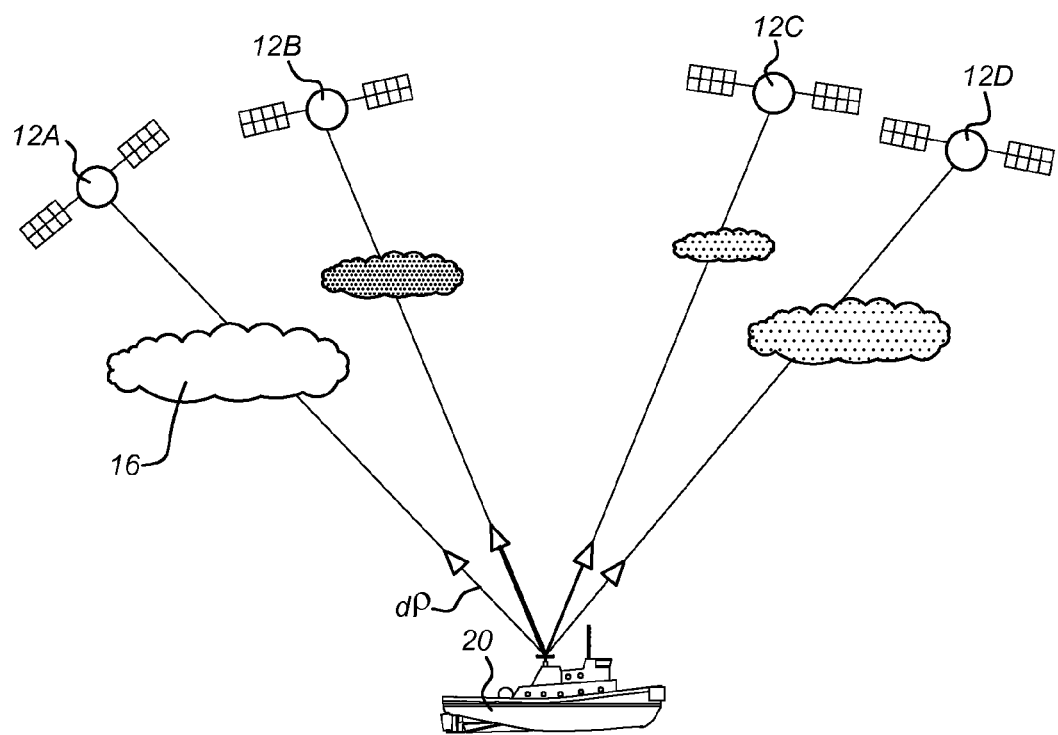
FIG. 5 shows a given user location with the predicted phase scintillation indices of the visible satellites at the user location mapped onto the position domain.

In order to measure the phase scintillation effect on GNSS positioning at a given user location the predicted phase scintillation indices of the visible satellites at the user location are mapped onto the position domain, as shown in FIG. 5. To do this, first the predicted phase scintillation index, between user u and satellite s, is converted to the range error $d\sigma_u^s$ in meters, which for L1 is:

$$d\rho(t)_u^s = \lambda \cdot \hat{\sigma}_{\phi 60}(t)_u^s \quad (10)$$

where $\lambda$ is the GNSS signal wavelength (0.19 m for GPS L1). Then, the mathematical model of standard single point positioning is used to compute positioning error:

$$\vec{r}_u(t) = (A^T W A)^{-1} A^T W Y_u \text{ and } SDOP(t) = \|\vec{r}_u(t)\| \quad (11)$$

$$Y_u = [d\rho(t)_u^1, d\rho(t)_u^2, \ldots, d\rho(t)_u^n]^T \quad (12)$$

where the design matrix A, weight matrix W and observation vector Y are time-dependent, n is number of visible satellites. In the weight matrix, the weight of a satellite is defined as a function of elevation angle of the satellite. We call the computed positioning error Scintillation Dilution Of Precision and denote it by SDOP. An ionosphere free solution e.g. for L1 and L2 would increase the SDOP index by a factor of 3.

The SDOP is an index that can be used as a measure of scintillation effect on precise positioning at the user location. It depends on the geometry of the visible satellites and phase scintillation status at the satellites' ionospheric pierce points. When there is no scintillation, $d\rho(t)_u^s$ values are around 3 mm, resulting in SDOP to be at the level of a few mm. In case of scintillation, $d\rho(t)_u^s$ values corresponding to the satellites affected by scintillation are increased, resulting in SDOP values that can be as large as several cm. An increase in SDOP leads to low accuracy of the ambiguity float solution and, consequently, to problems for ambiguity resolution in precise positioning models.

Prediction of Loss-of-Lock

As mentioned, deep signal fading caused by scintillation can lead to loss-of-lock of the carrier tracking loop in a GNSS receiver. It should be noticed that loss-of-lock depends also on quality and setup of receiver and antenna. For example, if a long cable is used for connection between antenna and receiver, it is more likely to experience loss-of-lock than the case of a short-cable. Because of this, it is difficult, if not impossible, to fully predict loss-of-lock at a given user location. Therefore, we only specify satellites which will have a chance for loss-of-lock in the next 24 hours.

In commercial GNSS reference networks, high quality receiver-antenna setups are generally used. If a reference station experiences loss-of-lock with respect to a satellite, then a user in the same area of the reference station will most likely also experience loss-of-lock.

$NLL_{60}$ (the number of cycle slips per minute) is used as a measure of chance for loss-of-lock. In order to predict $NLL_{60}$ for the next 24 hours, a loss-of-lock probability for the next 24 hours is assumed to be exactly the same as for the last 24 hours i.e. a simple unitary forecast model. Therefore, the measured time series of $NLL_{60}(t)_r^s$ at reference station r and satellite s is copied from the last 24 h to the next 24 h, e.g.

$$N\hat{L}L_{60}(t+24\ h)_r^s = NLL_{60}(t)_r^s. \quad (13)$$

Then, the Kriging method is used for interpolating the predicted $N\hat{L}L_{60}$ values epoch by epoch for the given user location.

Figure 6:
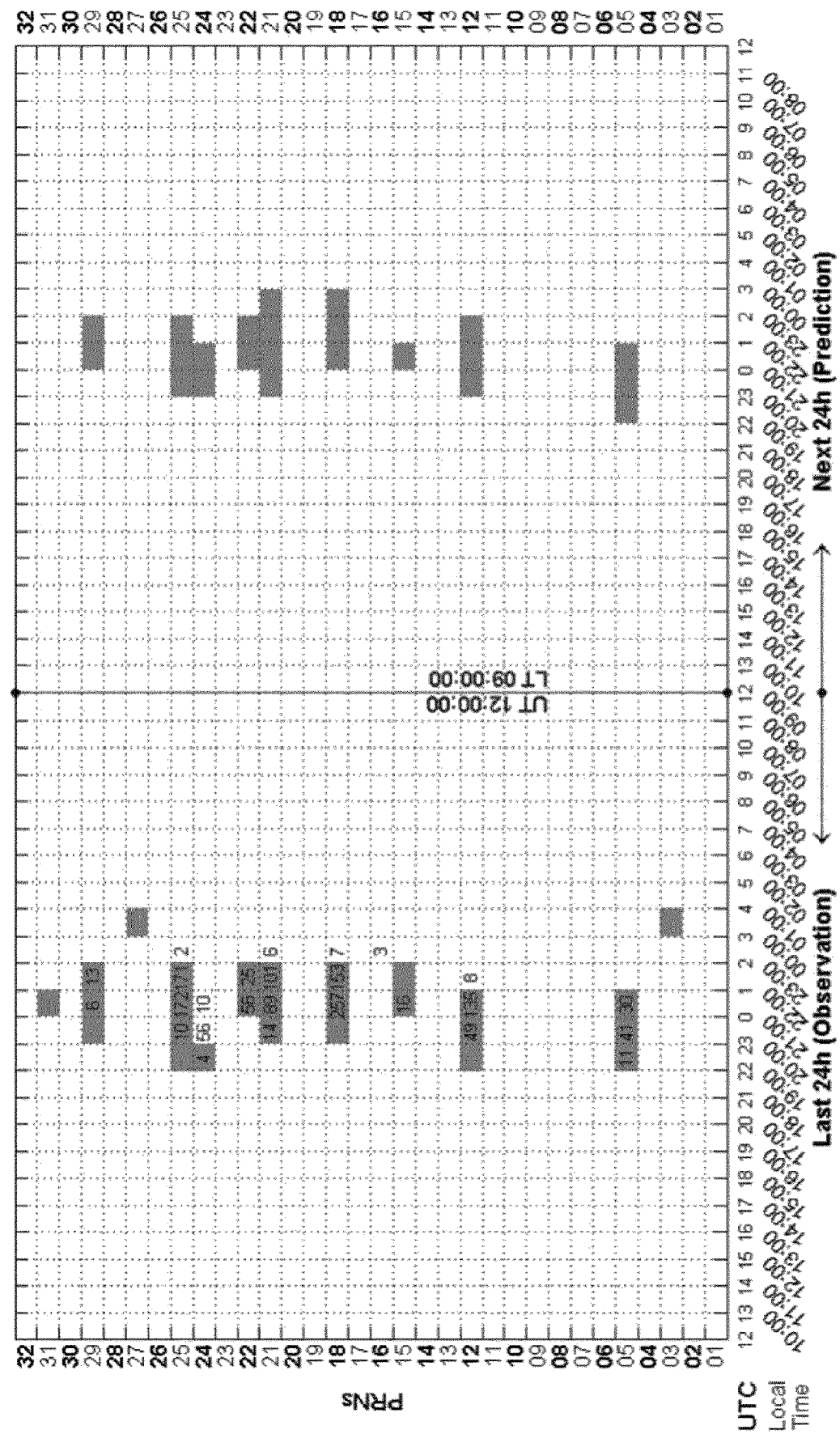
FIG. 6 shows a plot of observed and predicted Loss-Of-Lock for 27 Nov. 2013.

If the summation of interpolated $N\hat{L}L_{60}$ over an hour is not zero then there is a probability of loss-of-lock during this hour. In FIG. 6, as an example, the chance of loss-of-lock at the user location is visualized for all satellites for 27 Nov. 2013. In this figure, the past predictions are shown on the left of the figure with the future predictions shown on the right. The numbers indicate the actual number of observed cycle-slips during an hour as measured at the reference stations. This assists in determining the accuracy of past loss-of-lock prediction.

Adaptation Height of Scintillation

Figure 7:
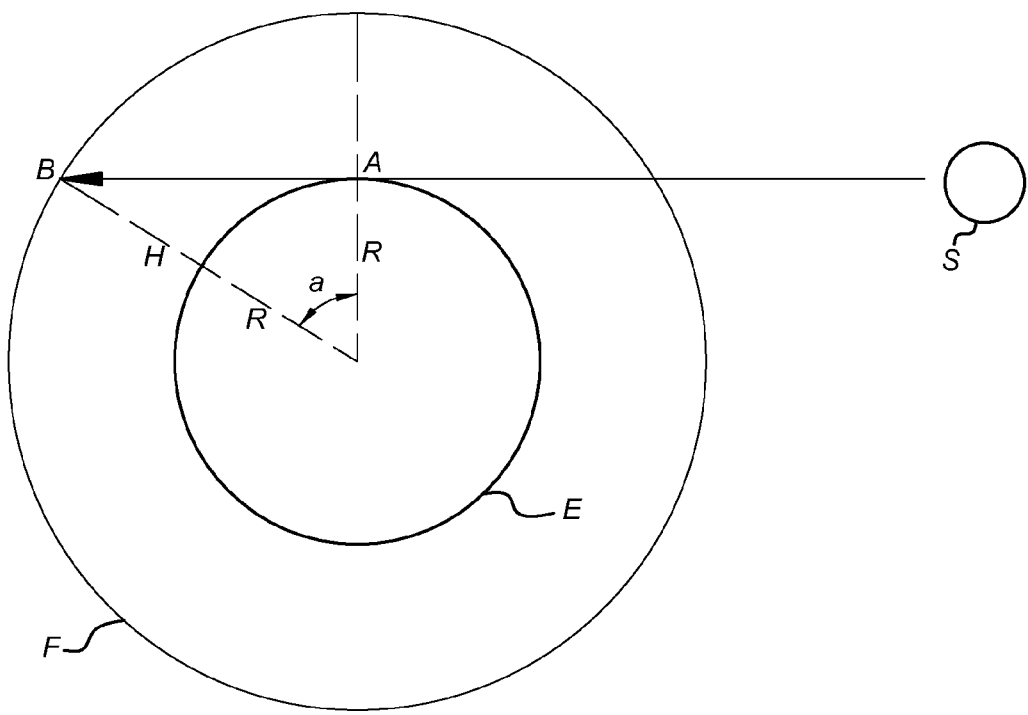
FIG. 7 shows an illustration indicating how the height of irregularities can be computed based on the geometry of the earth and the start time of scintillation.

In the equatorial region, the irregularities of electron density (or plasma bubbles) mostly are generated after sunset at height H of the F-layer of ionosphere above the equator E. As shown in FIG. 7, for the sun at S, sunset is at point A on the ground and point B at the F-layer. The height of irregularities can be computed based on the start time of scintillation as follows:

$$H = \frac{1-\cos(a)}{\cos(a)} \cdot R \quad (14)$$

where H is the height of the ionosphere and R the radius of earth. The difference between longitudes of A and B is denoted by a which corresponds to the time distance between the sunset on the ground and the start of scintillation.

In the evaluation of the IPPs the computed height H is used, being the height of the ionosphere thin-layer. It helps to adapt daily the ionospheric pierce points based on the height of the irregularities. This is then used in the subsequent Kriging and for the plotting of the scintillation map.

L-Band Scintillation

The geostationary satellites, which are at an almost fixed height and longitude above the equator, are used to provide GNSS corrections to users. These satellites use L-band signals for their communication. In case of severe scintillation, users may lose lock to these correction signals.

Figure 8:
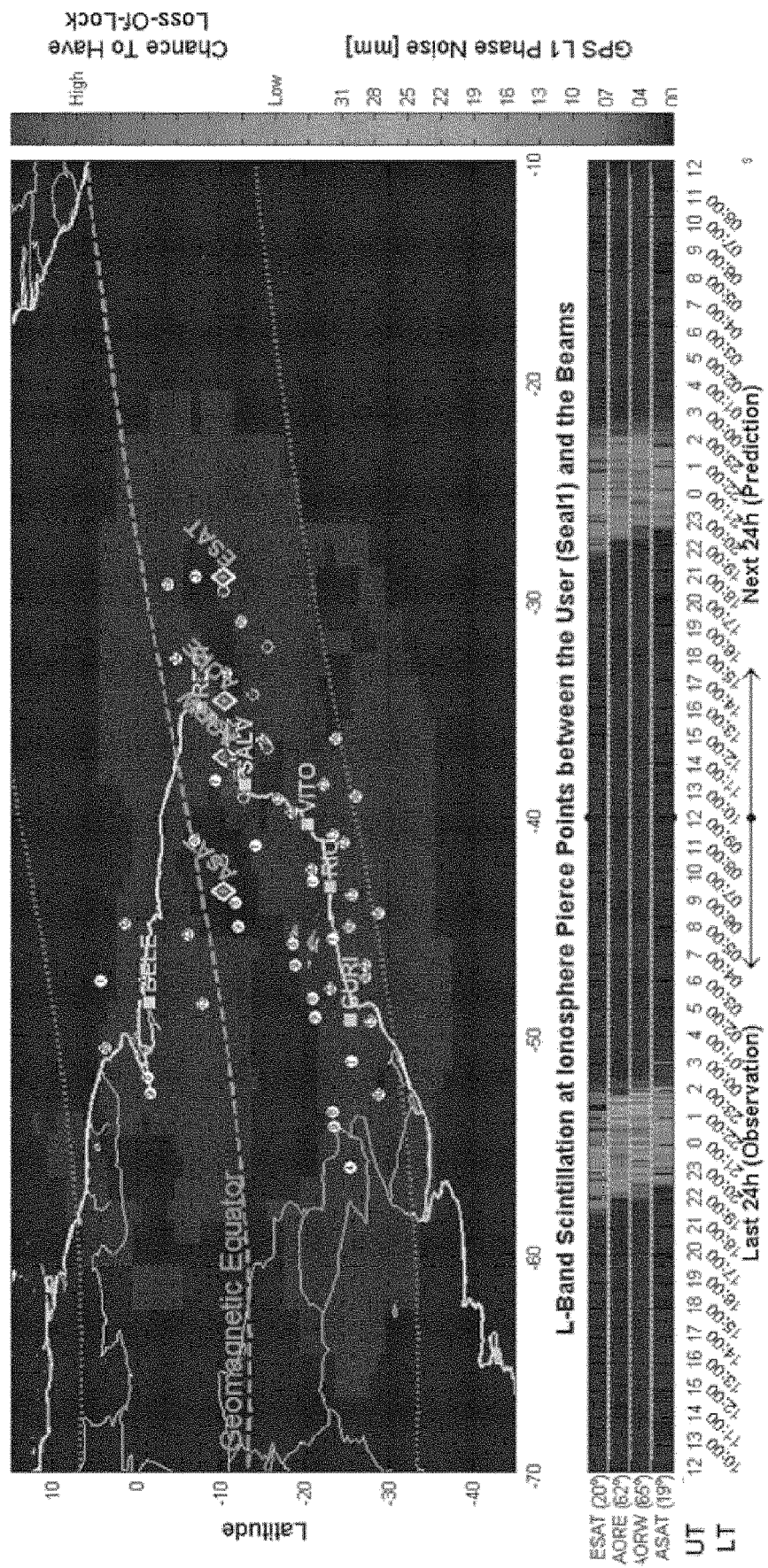
FIG. 8 provides a plot of L-band scintillation measurement at IPPs for reference stations in South America and predictions for a user location.

L-band scintillation values can be provided for all visible geostationary satellites at the user location. The time series of scintillation index is computed for the IPPs between the user and the L-band satellites. It will be understood that since the geostationary satellites do not generally transmit data sufficient to calculate ionospheric scintillation indices directly, interpolation within a patch to determine L-band scintillation data based on indices generated from the earth-orbiting satellites is a convenient way of generating valuable data. FIG. 8 provides a plot of L-band scintillation measurement at IPPs for reference stations in South America and predictions for a user location.

Flow Chart of Scintillation Forecast

Figure 9:
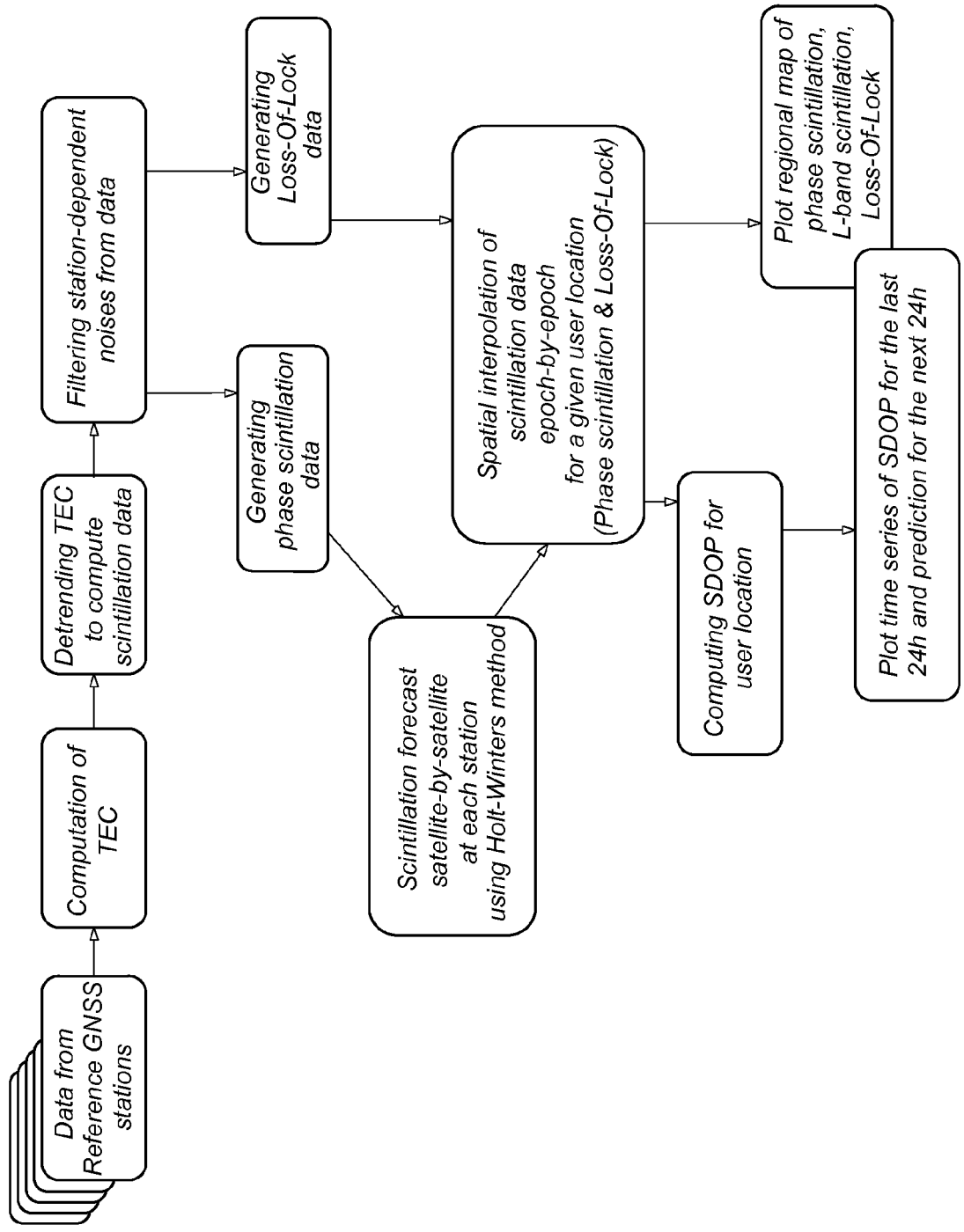
FIG. 9 shows a flow chart of processing steps for the scintillation forecast of the invention.

To better illustrate the process according to an embodiment of the invention a flow chart of processing steps for forecasting scintillation is shown in FIG. 9. In the illustrated example shown in FIG. 9, the steps are carried out at the Network Control Center (NCC) for a dual frequency GNSS system. It will nevertheless be understood that certain steps may alternatively be carried out locally at the user location. In a first step 101, data from the reference GNSS stations is transmitted to the NCC, where it is received by the processing unit 22 for subsequent processing. The data includes the code and phase observables and Signal-to-noise ratio (SNR) at the two frequencies. In step 102, TEC values for the respective IPPs are calculated for each satellite and each reference station using the phase geometry-free linear combination between the two frequencies, with the slant TEC being converted to VTEC by equations (1) and (2) above.

In step 104, the TEC data is detrended by between-epoch differencing to compute the rate of TEC according to equation (4) and then the scintillation data ($d\phi$) computed using equation (5). The scintillation data is then subject to various filtering steps at 106, primarily to remove station-dependent noise from the data. The station dependent noise may include local interference and other effects.

At step 108, the phase scintillation index is generated by calculating, the standard deviation of the change of phase $d\phi$ over every 60 seconds (denoted by $\sigma_{\phi 60}$) according to equation (5). This data is then used for forecasting the expected phase scintillation index for the period 24 hours ahead using the Holt-Winters method according to equation (9) in step 110. This is performed satellite-by-satellite for each of the satellites observed by a given reference station and for each reference station.

In parallel to steps 108 and 110, loss of lock data, $NLL_{60}$ (the number of cycle slips per minute) is generated in step 112 for each of the reference stations and satellites. Using equation (13) a predicted loss of lock for the next 24 hours is defined.

The data from both steps 110 and 112 is spatially interpolated in step 114 using Kriging to provide data specific for a given user location, based on the respective IPP for that user location and observations of a given satellite.

In step 116, the range error computed according to equation (10) is used to determine the SDOP for the user location according to equation (11). This can be plotted as a time series for a given period e.g. past and future 24 hour period on a user display (not shown). Additionally, at step 120, a regional map can be displayed for relevant data, including the phase scintillation index, the L-band scintillation values at the IPPs of the geostationary satellites and the loss-of lock probability.

Results of the Scintillation Forecast

In order to show performance of the Holt-Winters method, six reference stations in South America were used to predict scintillation of a user location: Lat. 11° S and Lon. 36° W. Data was processed from 27 to 30 Nov. 2013 when scintillation was severe.

The time series of $\sigma_{\phi 60}$ between reference station Recife and five GPS satellites from 27 to 29 November was measured and the predicted $\sigma_{\phi 60}$ calculated. The selected five satellites were affected by scintillation for a few hours. The day to day variability of the scintillation level and duration was observable in the data.

Figure 10:
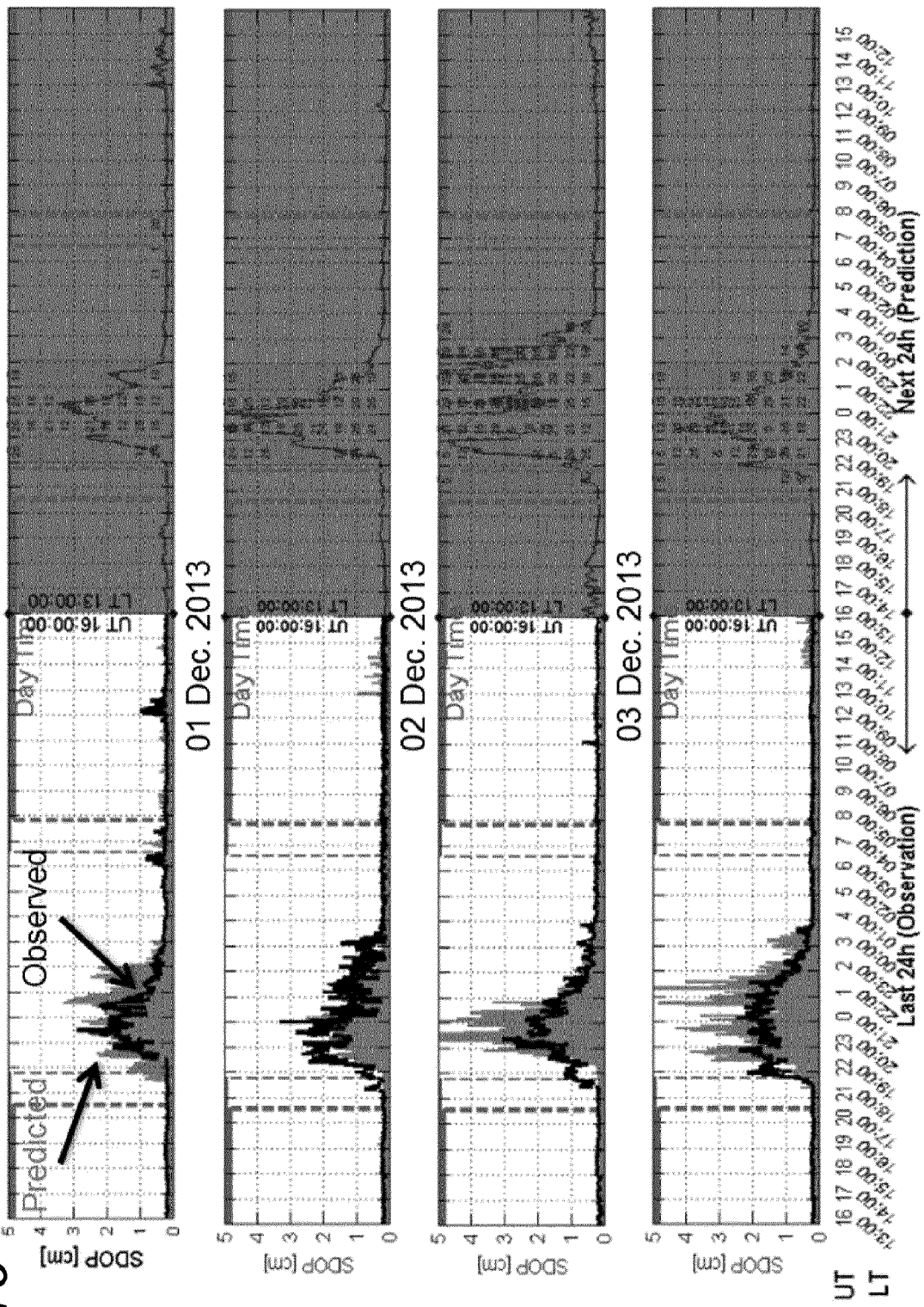
FIG. 10 shows time series of measured and predicted SD OP for a user location from 30 Nov. to 3 Dec. 2013.

Using the predicted $\sigma_{\phi 60}$ at the reference stations, the SDOP of the user was computed for 4 days from 30 Nov. to 3 Dec. 2013. The time series of the measured and predicted SDOP (at UTC 16:00) are shown in FIG. 10. The black curve over the last 24 hours is the measured SDOP which becomes the predicted SDOP for the next 24 hours. To control the quality of the prediction, the previously predicted SDOP for the last 24 hours is shown in light shading. As seen the timing of the predicted SDOP for the severe scintillation hours fit well to the measured SDOP. The level of predicted SDOP could be improved by optimization of the smoothing parameters in the Holt-Winters method based on further analysis of the observations over the previous 24 hours.

The repeatability of the small-scale irregularities in time and space allows scintillation to be predicted using the disclosed near real-time scintillation forecast system. Testing of the scintillation forecast for low-latitude regions (e.g. West-Africa, South-America and India) has shown promising results that are subject to further optimization. Statistical analysis of the prediction quality resulted in 70% correct prediction of severe scintillation.

Because of the seasonality pattern in the scintillation data, the Holt-Winters method is an effective method for predicting the phase scintillation in time. The Kriging interpolator is an appropriate method for spatial prediction of the phase scintillation. Combination of the Holt-Winters method and Kriging provides a tool for statistically predicting the scintillation for the next 24 h for any given location inside or outside the reference network. It will equally be understood that the same process may be used for predicting over periods of multiple days, should this be required.

Thus, the invention has been described by reference to the embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

The invention claimed is:

1. A method for generating ionospheric scintillation prediction data comprising:
   a) for a plurality of satellites, and reference stations, measuring phase scintillation data, satellite by satellite for each reference station during multiple epochs;
   b) forecasting an expected phase scintillation value for each satellite and reference station for a period of at least 24 hours based on a cyclical prediction model;
   c) for a given user location and a given satellite, spatially interpolating the expected phase scintillation values of the plurality of reference stations to determine a predicted phase scintillation index;
   d) repeating step c) for satellites visible from the user location;
   e) for the plurality of satellites and reference stations, determining loss-of-lock occurrences for a carrier tracking loop of a Global Navigation Satellite System (GNSS) receiver at the reference station;
   f) forecasting expected loss-of-lock occurrences for each satellite and reference station for a period of at least 24 hours based on a cyclical prediction model; and
   g) for the user location and given satellite, spatially interpolating the expected loss-of-lock occurrences of the plurality of reference stations to determine a loss-of-lock indicator for the given satellite at the user location.

2. The method according to claim 1, wherein the method further comprises a step e) of converting the phase scintillation index for each satellite into a range error with respect to the user location.

3. The method according to claim 2, wherein the ionospheric scintillation prediction data comprises a Scintillation Dilution Of Precision (SDOP) index and step e) comprises computing the SDOP index by mapping the predicted phase scintillation indices of the satellites visible from the user location onto a position domain.

4. The method according to claim 1, wherein step b) takes place using a Holt-Winters prediction model.

5. The method according to claim 4, wherein step b) takes place using a multiplicative Holt-Winters prediction model, whereby for an expected phase scintillation value k epochs ahead, the sum of the local mean level and the trend over k epochs is multiplied by a factor indicative of the variation over the period.

6. The method according to claim 1, wherein step c) takes place by determining ionosphere pierce points (IPPs) for signals received from the given satellite for each of the reference stations.

7. The method according to claim 6, further comprising performing linear spatial interpolation between the IPPs.

8. The method according to claim 6, further comprising determining the height of the IPPs by determining the time difference between scintillation start-up and sunset at ground level.

9. The method according to claim 1, further comprising providing the ionospheric scintillation prediction data to a user at the user location.

10. The method according to claim 1, further comprising displaying the predicted loss-of-lock indicator to a user at the user location.

11. The method according to claim 1, further comprising determining a user location for a given user and generating the ionospheric scintillation prediction data on the basis of the determination.

12. The method according to claim 1, wherein the reference stations comprise multi-frequency receivers and step a) takes place by a linear combination of the dual frequency phase measurements.

13. The method according to claim 1, wherein the plurality of satellites are earth-orbiting satellites and the method further comprises estimating the phase scintillation information for ionosphere pierce points (IPPs) between the user location and geostationary satellites visible from the user location and transmitting the phase scintillation information to a user at the user location.

14. A system for generating ionospheric scintillation prediction data from Global Navigation Satellite System (GNSS) satellite signals and for providing the ionospheric scintillation prediction data to a user at a user location, the system comprising:
- a plurality of reference stations having multi-frequency receivers adapted to receive the GNSS satellite signals;
- a processing unit; and
- a memory storing instructions, which when executed by the processing unit causes the processing unit to:
  - a) for a plurality of satellites, and the reference stations, measure phase scintillation data, satellite by satellite for each reference station during multiple epochs;
  - b) forecast an expected phase scintillation value for each satellite and reference station for a period of at least 24 hours based on a cyclical prediction model;
  - c) for a given user location and a given satellite, spatially interpolate the expected phase scintillation values of the plurality of reference stations to determine a predicted phase scintillation index;
  - d) repeating step c) for satellites visible from the user location;
  - e) for the plurality of satellites and reference stations, determining loss-of-lock occurrences for a carrier tracking loop of a GNSS receiver at the reference station;
  - f) forecasting expected loss-of-lock occurrences for each satellite and reference station for a period of at least 24 hours based on a cyclical prediction model; and
  - g) for the user location and given satellite, spatially interpolating the expected loss-of-lock occurrences of the plurality of reference stations to determine a loss-of-lock indicator for the given satellite at the user location.

15. A non-transitory computer readable medium comprising instructions which when executed by a processing unit, causes the processing unit to:
- a) for a plurality of satellites, and the reference stations, measure phase scintillation data, satellite by satellite for each reference station during multiple epochs;
- b) forecast an expected phase scintillation value for each satellite and reference station for a period of at least 24 hours based on a cyclical prediction model;
- c) for a given user location and a given satellite, spatially interpolate the expected phase scintillation values of the plurality of reference stations to determine a predicted phase scintillation index;
- d) repeating step c) for satellites visible from the user location;
- e) for the plurality of satellites and reference stations, determining loss-of-lock occurrences for a carrier tracking loop of a Global Navigation Satellite System (GNSS) receiver at the reference station;
- f) forecasting expected loss-of-lock occurrences for each satellite and reference station for a period of at least 24 hours based on a cyclical prediction model; and
- g) for the user location and given satellite, spatially interpolating the expected loss-of-lock occurrences of the plurality of reference stations to determine a loss-of-lock indicator for the given satellite at the user location.

16. The non-transitory computer readable medium of claim 15, further comprising instructions, which when executed by the processing unit, causes the processing unit to map ionospheric scintillation prediction data into a position domain on a user display.

17. The non-transitory computer readable medium of claim 15, further comprising instructions, which when executed by the processing unit, causes the processing unit to:
- enabling a user at a user location to receive ionospheric scintillation prediction data; and
- view the ionospheric scintillation prediction data on a user display at the user location.

* * * * *